United States Patent [19]

Kraus

[11] Patent Number: 5,363,810

[45] Date of Patent: Nov. 15, 1994

[54] TWO HANDLED ANIMAL CONTROL TETHER

[76] Inventor: Lawrence Kraus, 37 Cedarwood Dr., Pomona, Calif. 91766

[21] Appl. No.: 90,288

[22] Filed: Jul. 12, 1993

[51] Int. Cl.⁵ ............................................. A01K 27/00
[52] U.S. Cl. .................................................. 119/795
[58] Field of Search ................. 119/96, 106, 109, 769, 119/792, 793, 795, 797, 856; 224/218, 242, 246; 54/34

[56] References Cited

U.S. PATENT DOCUMENTS

| | | | |
|---|---|---|---|
| 2,023,950 | 12/1935 | Carter | 119/109 |
| 2,275,983 | 3/1942 | Nadeav | 119/96 |
| 2,356,715 | 8/1944 | Webster | 119/109 |
| 2,861,547 | 11/1958 | Dale | 119/109 |
| 3,332,398 | 7/1967 | Mintz | 119/109 |
| 4,763,609 | 8/1988 | Kulik | 119/109 |
| 4,879,972 | 11/1989 | Crowe et al. | 119/109 |
| 5,038,719 | 8/1991 | McDonough | 119/109 X |

*Primary Examiner*—Gene Mancene
*Assistant Examiner*—Thomas Price

[57] ABSTRACT

The animal control tether comprises an elongated body, first and second handles, and a clasping device. The elongated body has a first end section and a second, opposite end section. The first handle is located at the first end section of the elongated body for providing relatively distant control over an animal. The clasping device is affixed to the second end section of the elongated body. The second handle is located at the second end section. The second handle is constructed so as to remain slack, regardless of any tension exerted on the elongated body by an animal during use, until the second handle is grasped by an animal handler desiring close control over the animal's movements.

5 Claims, 5 Drawing Sheets

TWO HANDLED ANIMAL CONTROL TETHER

BACKGROUND OF THE INVENTION

1. Field of the Invention

This invention relates to animal control tethers, and more particularly to an improved handle configuration for animal control tethers.

2. Description of the Related Art

Dog leashes have remained virtually unchanged for hundreds of years. Their "classic" design, which allows for only one handle to restrict an animal's movement, forces the handler to seek a second grip when more control is required, as when in public. This second grip will usually entail one of the two following habits: a straight grab at the far end of the leash or several wrappings of the leash around the palm and fingers. Both methods can cause an injury to the hand of the handler if the animal pulls, either by a rope burn or painful constriction of the hand, respectively. Without a functional means of appropriately controlling the animal an owner may be thrust into socially unacceptable conduct while transporting the dog. In today's over crowded social framework the outdated one handle dog leash design needs to be discarded.

In partial response to this problem the present applicant is aware of two animal leashes which are commercially available. A first of these leashes is manufactured by Hartz Mountain Corporation, Harrison, N.J. It is marketed under the product name "EXTENDING LEAD". A drawing of the same is shown as FIG. 1. The EXTENDING LEAD 10 has loop 12 for providing close control over an animal. However, loop 12 is an integral part of the leash and becomes taut when the animal pulls on the leash, thereby compressing the loop so that the opening is no longer easily accessible for the user.

The second leash is commercially available under the name "E-Z HANDLER" by Fur-Pets-Only of Visalia, Calif. This is illustrated in FIG. 2, designated generally as 14. The E-Z HANDLER 14 suffers from the same deficiencies as the EXTENDING LEAD of FIG. 1. It is difficult to grasp the shorter lead handle 16 when the leash is pulled taut by the animal.

OBJECTS AND SUMMARY OF THE INVENTION

Accordingly, it is a principal object of the present invention to provide a second handle on a leash which is located very close to the animal under supervision.

It is another object of the present invention to provide a second handle that maintains its unobstructed entry even after the animal has pulled the leash taut.

It is yet another object to provide a leash which will enable its handler to maintain better control of his/her animal while in public.

It is still another object to provide a leash which will enable its handler to maintain better control of his/her animal during training.

These and other objects are achieved by the present invention which is an animal control tether. In its broad aspects, the animal control tether comprises an elongated body, first and second handles, and a clasping device. The elongated body has a first end section and a second, opposite end section. The first handle is located at the first end section of the elongated body for providing relatively distant control over an animal. The clasping device is affixed to the second end section of the elongated body. The second handle is located at the second end section. The second handle is constructed so as to remain slack, regardless of any tension exerted on the elongated body by an animal during use, until the second handle is grasped by an animal handler desiring close control over the animal's movements.

In a first embodiment, the second end of the elongated body comprises a penultimate portion being provided by passing a section thereof through an aperture of the clasping device and being secured unto itself. The penultimate portion terminates with an ultimate end portion. The ultimate end portion comprises an ultimate end of the elongated body secured to the penultimate portion so as to provide a loop serving as said second handle.

In a second embodiment the second end section of the elongated body comprises an end of the elongated body being affixed to the clasping device. A slack loop is formed at a penultimate portion of the second end section so as to serve as the second handle.

The second handle provides a short lead in a range between 6 and 24 inches, for providing a desired close control over the animal's movements. The short lead is defined as the distance from a far end of the clasping device (i.e. where it connects to the animal's collar) to the end of the second handle means when that second handle is in a taut position.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures of the drawings are designated by the same reference characters.

DETAILED DESCRIPTION OF THE PREFERRED EMBODIMENTS

Figure 1:
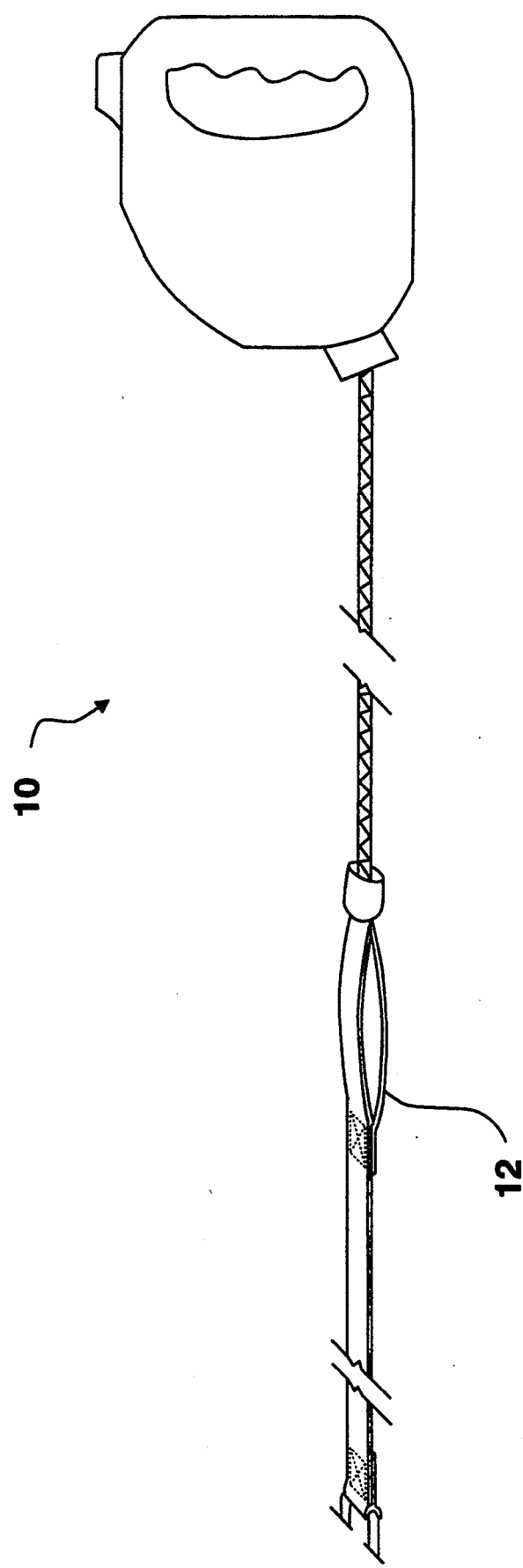
FIG. 1 illustrates a first type of prior art dog leash.
Figure 2:
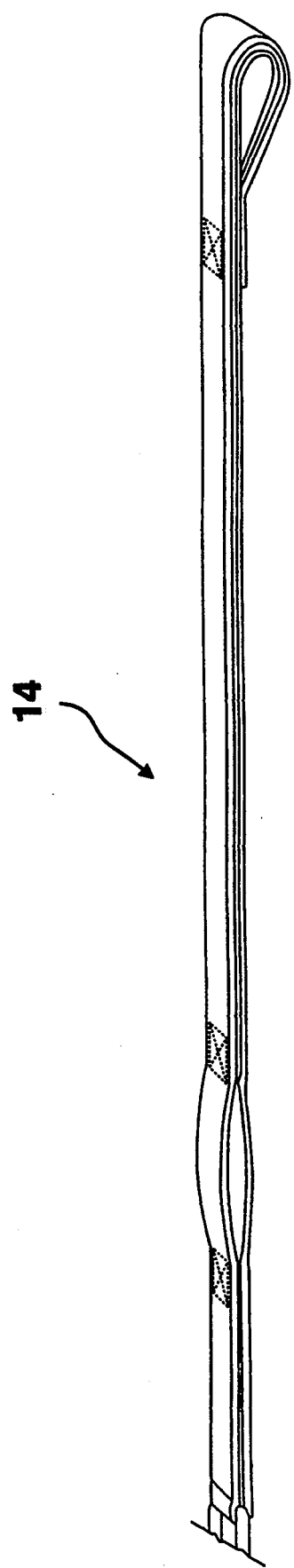
FIG. 2 illustrates a second type of prior art dog leash.
Figure 3:
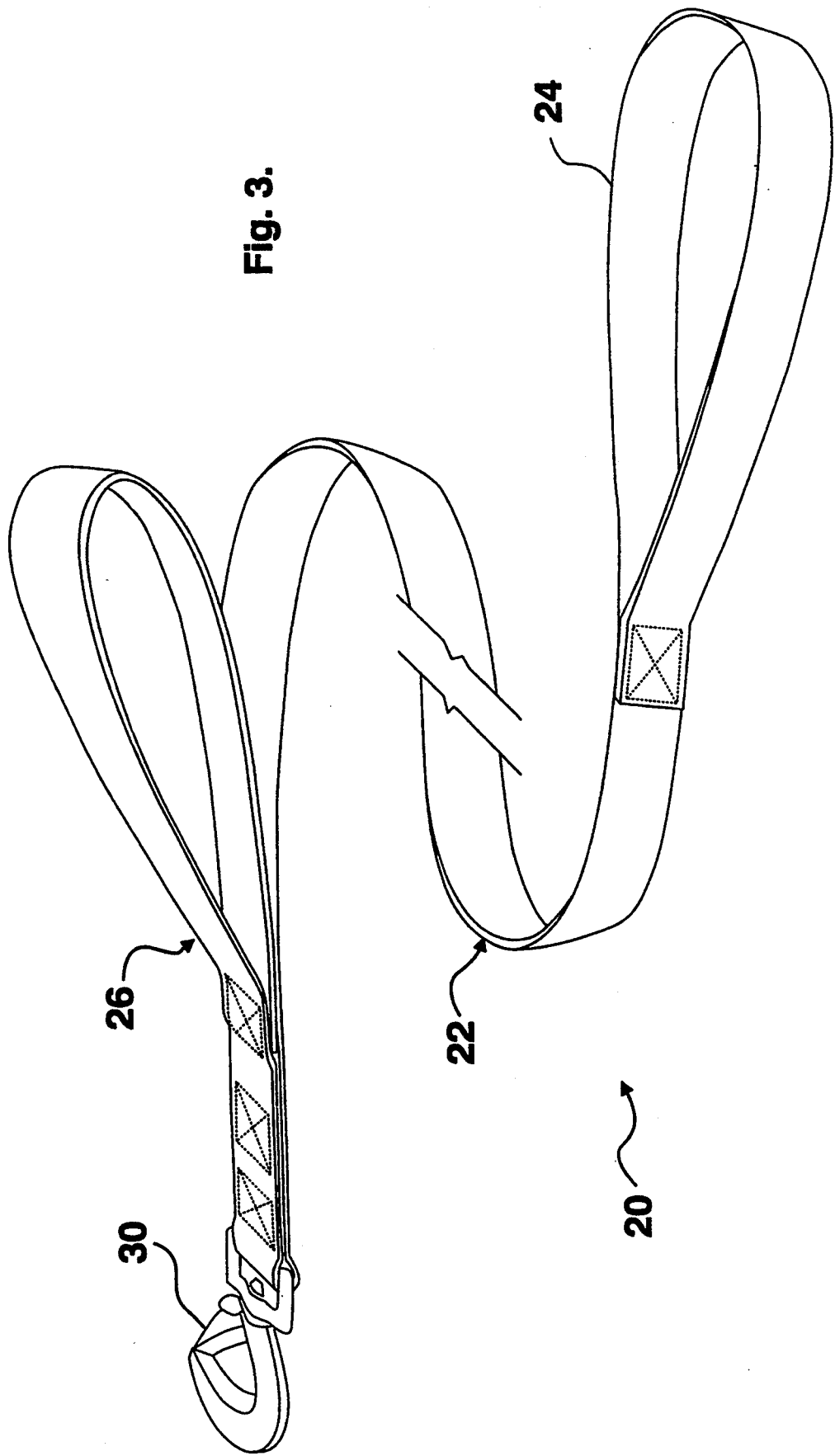
FIG. 3 is an overall perspective view of a preferred embodiment of the present invention.

Referring to the drawings and the characters of reference marked thereon, FIG. 3 illustrates a preferred embodiment of the present invention, designated generally as 20. Animal control tether or leash 20 comprises an elongated body 22 having a first end with a first handle means 24, as in a conventional leash, for providing relatively distant control over the animal. Typically, the elongated body 22 is from about four feet to about six feet long, although some leashes may be as short as three feet and as long as twenty feet.

Figure 4:
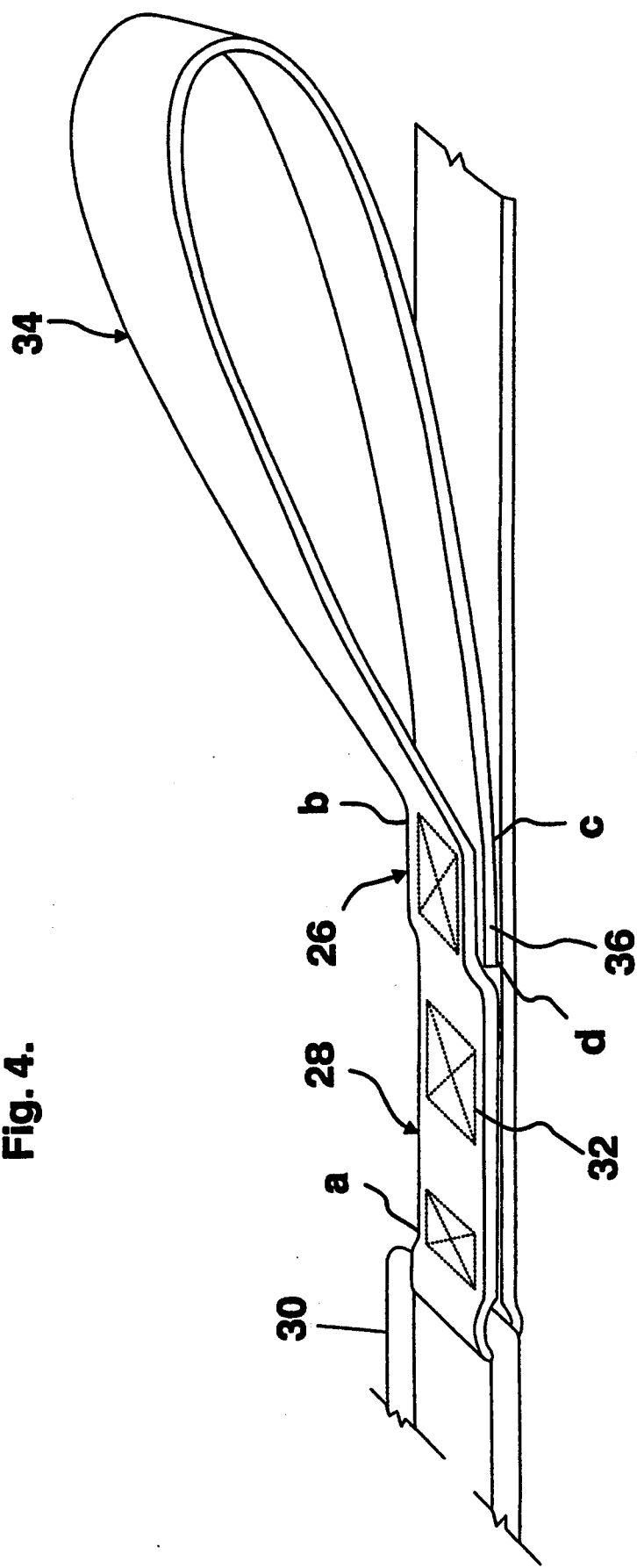
FIG. 4 is a view in detail of the second looped handle of the embodiment of FIG. 3, as it is formed into the lower end of the leash by means of folding and sewing it back into the main elongated body of the leash.

A second handle means 26, is located at a second end section of the elongated body 22. Referring now to FIG. 4, this second end section or handle means 26 is shown enlarged. Second end section 26 includes a penultimate portion 28. Penultimate portion 28 is provided by passing a section thereof through an aperture of a clasping device 30 and being secured unto itself, preferably by stitching 32. The penultimate portion 28 terminates with an ultimate end portion 34. The ultimate end portion 34 forms a slack, unobstructed loop with an ultimate end 36 thereof secured to the penultimate portion 28, preferably by stitching. Thus the second handle means is provided.

The manner of using my two handled leash is dramatically different from the now commonly used single handled dog leash. By providing two grips (i.e. handles), a dog handler has noticeably increased control over the animal's movements. When an animal is pulling against the leash, a grip can still be acquired in the second handle due to its unobstructed loop (i.e. second handle 34 even when the leash is taut. The clasping device 30 allows for easy access to an animal collar for attachment and detachment of the leash.

The present invention is a major improvement over prior art two handled leashes. It is constructed so that the second handle 34 remains slack, regardless of any tension exerted on the elongated body by an animal during use, and remains so, until that second handle is grasped by an animal handler desiring close control over the animal's movements.

The animal control tether of the present invention may be comprised of a variety of materials, including synthetic materials such as webbed nylon, or natural material such as leather.

The length of penultimate portion 28 of the tether 10, between positions a and b, should be between ½ and 10 inches, preferably about 4 inches. The length of the ultimate end portion 34 (i.e. from the positions where the fabric is secured onto itself), from position b to position c, should be between 10 and 20 inches, preferably about 14 inches. The length of the ultimate end 36, between positions c and d, should be between ½ and 2 inches, preferably about 1 inch. The elongated body is generally from ½ to 2 inches in width.

Figure 5:
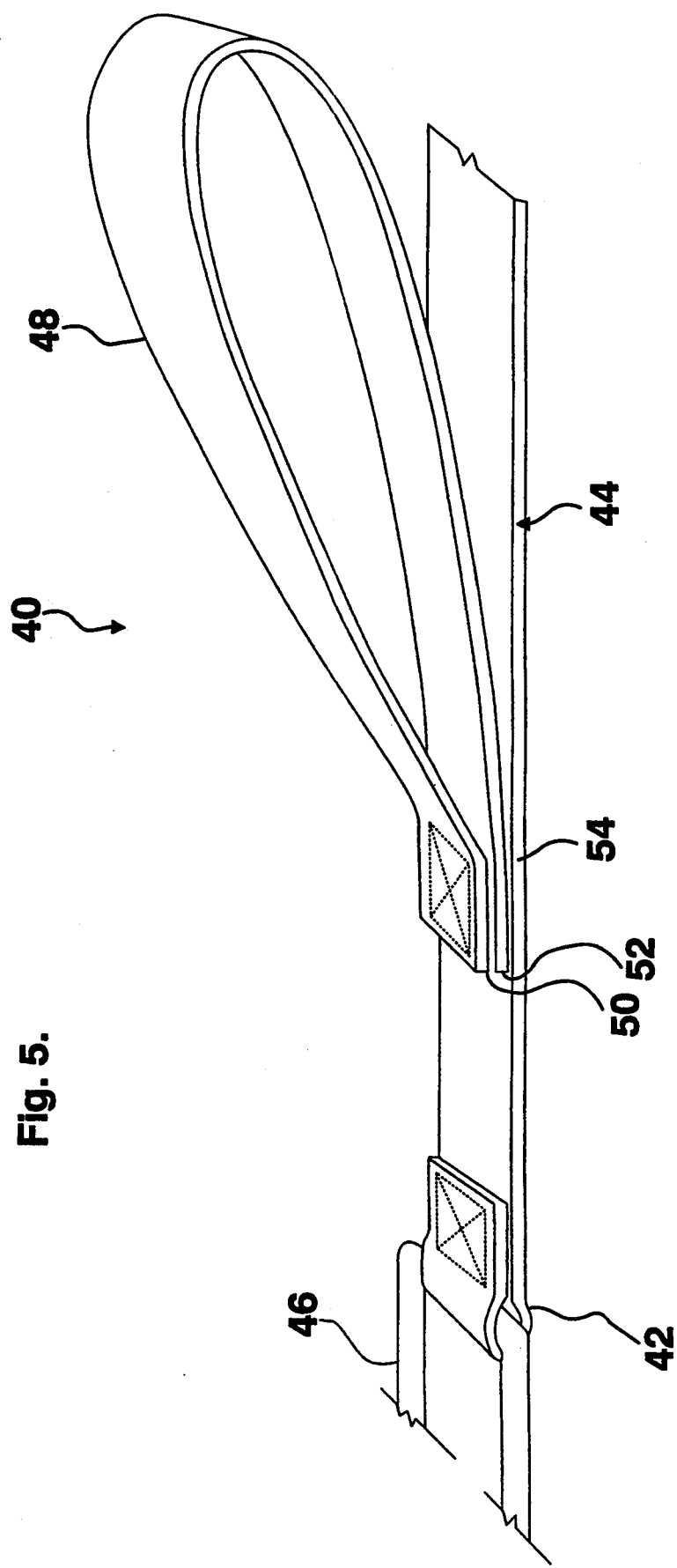
FIG. 5 is a detailed view of a second embodiment of the present invention, illustrating the use of a second looped handle attached to the lower end of the leash using a separate piece of material.

Referring now to FIG. 5, a second embodiment of the second end section is illustrated, designated generally as 40. In this embodiment, an end 42 of an elongated body 44 is affixed to a clasping device 46. A loop 48 is formed at a penultimate portion 54 of the second end section 40. The loop 48 comprises an elongated element having a first element end 50 and a second element end 52. Ends 50,52 are secured to each other and to the penultimate portion 54. As with the previous embodiment, the loop or second handle 48 remains slack regardless of tension exerted on the elongated body by an animal during use.

Accordingly, it is readily seen that the two handled leash of the present invention is a major improvement over current leash designs due to its enhanced supervisory ability, lower cost (as compared to buying two different length leashes), and possible ability to reduce injury to its user.

Obviously, many modifications and variations of the present invention are possible in light of the above teachings. For example, the looped second handle could be attached to the main leash body by other means or could be formed of a different material from that of the main leash. Or, the clasp design could vary, etc. It is therefore to be understood that, within the scope of the appended claims, the invention may be practiced otherwise than as specifically described.

What is claimed and desired to be secured by Letters Patent of the United States is:

1. An animal control tether, comprising:
   a) an elongated body having a first end section and a second, opposite end section;
   b) first handle means located at said first end section of said elongated body for providing relatively distant control over an animal;
   c) a clasping device affixed to said second end section of said elongated body; and,
   d) second handle means located at said second end section, said second handle means being so constructed so as to remain slack, regardless of any tension exerted on said elongated body by an animal during use, until said second handle is grasped by an animal handler desiring close control over said animal's movements, wherein said second end section of said elongated body comprises:
      a penultimate portion being provided by passing a section thereof through an aperture of said clasping device and being secured unto itself,
      said penultimate portion terminating with an ultimate end portion, said ultimate end portion comprising an ultimate end of said elongated body secured to said penultimate portion so as to provide a loop serving as said second handle means.

2. The animal control tether of claim 1, wherein said penultimate portion is secured unto itself by stitching.

3. An animal control tether, comprising:
   a) a continuous strap member comprising an elongated body having a first proximal end section and a second, opposite distal end section;
   b) first handle means located at said first proximal end section of said elongated body for providing relatively distant control over an animal;
   c) a clasping device affixed near said second distal end section of said elongated body; and,
   d) second handle means positioned substantially about said second distal end section, said second handle means including means for maintaining said second handle means as a slack loop regardless of any tension exerted on said elongated body by an animal during use, until said second handle is grasped by an animal handler desiring close control over said animal's movements.

4. The animal control tether of claim 3, wherein said second end section of said elongated body, comprises:
   a) an end of said elongated body being affixed to said clasping device; and,
   b) a loop being formed at a penultimate portion of said second end section so as to serve as said second handle means.

5. The animal control tether of claim 4, wherein said loop formed at said penultimate portion comprises an elongated element having a first element end and a second, opposite element end, said first and second element ends being secured to each other and to said penultimate portion.

* * * * *